United States Patent Office 3,373,209
Patented Mar. 12, 1968

3,373,209
BIS(METALLO-DINITROALKYL) FORMALS
AND PREPARATION THEREOF
Donald J. Glover, Bowie, Md., assignor to the United
States of America as represented by the Secretary of
the Navy
No Drawing. Filed Aug. 29, 1962, Ser. No. 220,944
4 Claims. (Cl. 260—615)

The invention described herein may be manufactured and used by or for the Government of the United States of America for governmental purposes without the payment of any royalties thereon or therefor.

This invention relates generally to certain novel compositions of matter and to the preparation thereof. In particular, it is directed to bis(metallo-dinitroalkyl) formals having a terminal metallo-dinitromethyl group and their preparation.

Solid propellants include components which are often very costly to prepare and for this reason efficient and yet inexpensive methods for the preparation of these components are being constantly sought.

It is an object of this invention to provide an efficient and inexpensive method for the preparation of certain high energy plasticizers used in polymeric propellant binders.

It is a further object of this invention to provide novel compositions of matter which are high explosives and from which high energy plasticizers may be prepared.

The novel compounds of this invention find utility as high explosives and as compounds from which bis(2-fluoro-2,2-dinitroalkyl) formals may be prepared, such formals being high energy plasticizers for polymeric propellant binders. For example, bis(2-fluoro-2,2-dinitroethyl) formal, disclosed in copending application S.N. 173,592, filed Feb. 15, 1962, may be prepared by the direct fluorination of bis(potassium-2,2-dinitroethyl) formal.

The novel compositions of matter of this invention have the following structural formula:

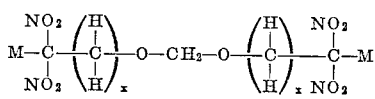

wherein M is an alkali metal such as lithium, sodium or potassium and x is 0, 1, 2 or 3.

Specific examples of bis(metallo-dinitroalkyl) formals containing a terminal metallo-dinitromethyl group which are embraced by the invention include bis(alkali metal-dinitroalkyl) formals such as bis(lithium-dinitromethyl) formal, bis(lithium-2,2-dinitroethyl) formal, bis(lithium-3,3-dinitropropyl) formal, bis(lithium-4,4-dinitrobutyl) formal, bis(sodium-dinitromethyl) formal, bis(sodium-2,2-dinitroethyl) formal, bis(sodium-3,3-dinitropropyl) formal, bis(sodium-4,4-dinitrobutyl) formal, bis(potassium-dinitromethyl) formal; bis(potassium-2,2-dinitroethyl) formal, bis(potassium-3,3-dinitropropyl) formal and bis(potassium-4,4-dinitrobutyl) formal.

The novel formals of the invention are prepared by reduction of the corresponding bis formal having a terminal trinitromethyl group by sequentially reacting said formal with hydrogen peroxide and an alkali metal hydroxide such as lithium hydroxide, sodium hydroxide and potassium hydroxide. Alternatively, the formal may be reacted with a solution of hydrogen peroxide in alkali metal hydroxide.

The following example illustrates a specific embodiment of the invention but it is to be understood that the scope of the invention is not to be limited thereto.

Example

Two grams (0.0054 mole) of bis(2,2,2-trinitroethyl) formal was dissolved in 25 ml. of methanol in a 250 ml. Erlenmeyer flask. Five ml. of 30% (11.5 M) hydrogen peroxide was then pipetted into the solution. The resultant solution was then mixed and cooled in an ice bath to about —10° C. A solution of four grams of potassium hydroxide in twenty ml. of methanol was cooled and slowly added with swirling. The solution became yellow immediately and a yellow solid began to precipitate. After completion of the potassium hydroxide addition, the yellow solid was filtered, sucked free of liquid (the solid should not be allowed to become completely dry at this stage, to avoid explosion), rinsed once with about ten ml. of methanol and immediately placed in five to ten ml. of water. The mixture was gently warmed to a thick solution and allowed to cool at ambient temperature. The precipitated solid was filtered, washed with methanol and dried at room temperature in a vacuum dessicator. The dry, recrystallized bis(potassium-2,2-dinitroethyl) formal weighed 1.4 gm. (73% of theoretical). The product has an impact sensitivity of 24 cm. which is comparable to cyclotrimethylenetrinitramine (RDX). The product must be kept wet at all times prior to the final methanol rinse in order to avoid violent decomposition.

Bis(trinitroethyl) formal may be prepared as disclosed in the copending application S.N. 173,592, filed Feb. 15, 1962, by reacting the polynitroalcohol with formaldehyde in the presence of strong sulphuric acid.

The reaction solvent is not limited to methanol, since any mutual solvent for the trinitroethyl formal and the alkali hydroxide may be used. Aliphatic alcohols and their water solutions such as $H_2O$/methanol are preferred. A $H_2O$/dioxane solution may also be utilized.

The method of preparing the bis(metallo-dinitroalkyl) formals may be carried out at pressures above or below atmospheric but the temperature should be kept below about 10° C. in order to assure a controlled reaction. The reaction may be carried out at any temperature below about 10° C., the lower temperature limit being defined by the freezing point of the reaction mixture.

The molar ratio of bis(trinitroalkyl) formal to alkali metal hydroxide to hydrogen peroxide is not critical but it is to be understood that in order to obtain the bis metallo compounds, at least two moles of alkali metal hydroxide and at least two moles of hydrogen peroxide per mole of bis(trinitroalkyl) formal should be utilized.

Obviously, many modifications and variations of the present invention are possible in the light of the above teachings. It is therefore to be understood that, within the scope of the appended claims, the invention may be practiced otherwise than as specifically described.

I claim:
1. Bis(metallo-dinitroalkyl) formals having the following structural formula:

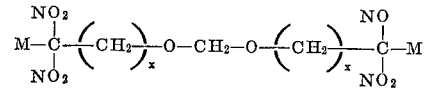

wherein M is an alkali metal selected from the group consisting of lithium, sodium and potassium and x is 0, 1, 2 or 3.

2. A bis(metallo-dinitroalkyl) formal having a terminal metallo-dinitromethyl group, said formal being selected from the group consisting of bis(lithium-dinitromethyl) formal, bis(lithium-2,2-dinitroethyl) formal, bis(lithium-3,3-dinitropropyl) formal, bis(lithium-4,4-dinitrobutyl) formal, bis(sodium-dinitromethyl) formal, bis(sodium-2,2-dinitroethyl) formal, bis(sodium-3,3-dinitropropyl) formal, bis(sodium-4,4-dinitrobutyl) formal, bis(potassium-dinitromethyl) formal, bis(potassium-2,2- dinitroethyl) formal, bis(potassium - 3,3 - dinitropropyl) formal and bis(potassium-4,4-dinitrobutyl) formal.

3. The method of preparing bis(metallo-dinitroalkyl) formals which comprises reacting a bis(trinitroalkyl) formal with hydrogen peroxide in the presence of a mutual solvent, adding an alkali metal hydroxide to the resultant solution and recovering a bis(metallo-dinitroalkyl) formal.

4. The method of preparing bis(metallo-dinitroalkyl) formals which comprises reacting a solution of a bis(trinitroalkyl) formal with a solution of hydrogen peroxide in an alkali metal hydroxide.

References Cited

UNITED STATES PATENTS 3,291,833  12/1966  Gold et al. _____ 260—615 XR

LEON ZITVER, *Primary Examiner.*

LEON D. ROSDOL, CARL D. QUARFORTH,
*Examiners.*

J. W. WHISLER, L. A. SEBASTIAN, H. MARS,
*Assistant Examiners.*